United States Patent [19]

Titus

[11] 4,212,312

[45] Jul. 15, 1980

[54] FRAGMENTED POLYMERS AS FRICTION REDUCERS IN PIPELINE TRANSPORTATION OF PRODUCTS

[75] Inventor: Paul E. Titus, Houston, Tex.

[73] Assignee: Shell Oil Company, Houston, Tex.

[21] Appl. No.: 937,363

[22] Filed: Aug. 28, 1978

Related U.S. Application Data

[63] Continuation-in-part of Ser. No. 793,993, May 5, 1977, abandoned, which is a continuation-in-part of Ser. No. 571,889, Apr. 25, 1975, abandoned, which is a continuation-in-part of Ser. No. 327,379, Jan. 29, 1973, abandoned, which is a continuation-in-part of Ser. No. 170,637, Aug. 10, 1971, abandoned.

[51] Int. Cl.$^2$ .............................................. F17D 1/16
[52] U.S. Cl. ........................... 137/13; 260/29.6 PM; 260/33.6 AQ; 260/33.6 UA; 260/34.2
[58] Field of Search ................ 137/13; 260/29.6 PM, 260/33.6 PQ, 34.2, 33.6 AQ, 33.6 UA

[56] References Cited

U.S. PATENT DOCUMENTS

| 3,215,154 | 11/1965 | White ...................................... 137/13 |
| 3,422,049 | 1/1969 | McClain ....................... 260/29.6 PM |
| 3,451,480 | 6/1969 | Zeh ....................................... 166/308 |
| 3,493,000 | 2/1970 | Canevari ................................ 137/13 |
| 3,503,917 | 3/1970 | Burke ............................. 260/29.6 R |
| 3,559,644 | 2/1971 | Seymour ................................ 137/13 |
| 3,730,275 | 5/1973 | McClaffin ............................. 137/13 |
| 3,775,353 | 11/1973 | Kohne ......................... 260/29.6 PM |
| 3,910,856 | 10/1975 | Kruks ..................................... 137/13 |

FOREIGN PATENT DOCUMENTS

6407656  1/1965 Netherlands .................... 260/29.6 PM

OTHER PUBLICATIONS

A.I. Ch. E. Journal; Mar. 1971, pp. 391–397.
Ind. Eng. Chem. Prod.; Res. Develop., vol. 9, No. 4, 1970, pp. 548–552.

*Primary Examiner*—Alan Cohan

[57] ABSTRACT

A process for reducing the flowing friction of a liquid hydrocarbon in a pipeline with a polymer soluble in the hydrocarbon by preparing a particulated, substantially undegraded polymer for introduction into a hydrocarbon by mixing the polymer with a solvent, surfactant, and water, whereby the polymer is dissolved, and forming polymer particles in the resulting liquid by flashing off the solvent and injecting the particles into the hydrocarbon.

11 Claims, No Drawings

FRAGMENTED POLYMERS AS FRICTION REDUCERS IN PIPELINE TRANSPORTATION OF PRODUCTS

CROSS-REFERENCE TO RELATED PATENT APPLICATION

This is a continuation-in-part of application Ser. No. 793,993 filed May 5, 1977 and now abandoned, which in turn is a continuation-in-part of application Ser. No. 571,889 filed Apr. 25, 1975 and now abandoned, which in turn is a continuation-in-part of application Ser. No. 327,379 filed Jan. 29, 1973 and now abandoned, which in turn is a continuation-in-part of application Ser. No. 170,637 filed Aug. 10, 1971 and now abandoned.

BACKGROUND OF THE INVENTION

1. Field of the Invention

The present invention is directed to a novel method of particulating or fragmenting polymeric materials having friction reducing properties so as to improve handling and solubilization by providing a mixture of the polymeric materials in a suitable solvent containing a nonionic surfactant having hydrophobic-hydrophilic constituents, and thereafter contacting the mixture with an aqueous liquid such as water, thereby effecting particulization or fragmentation of the polymeric material. The polymeric particles of from about 1 to about 10,000 microns thus formed are easily recovered by flashing off the solvent, and the aqueous phase removed thereafter, leaving behind polymer particles which are easy to handle and readily dissolvable in hydrocarbons such as oil, fractions thereof, or slurries of solids in hydrocarbon liquids.

2. Description of the Prior Art

Various methods have been proposed for reducing friction during pipeline transportation of liquid hydrocarbons such as crude oil and fractions thereof or hydrocarbon slurries. The most desirable means for effecting this is by use of friction reducing additives as described in U.S. Pat. Nos. 3,215,154; 3,451,480; 3,493,000; 3,559,664 or as described in AiChE Jr., March, 1971, Pages 391-397 and Ind. Eng. Chem. Prod. Res. Develop. Vol. 9, No. 4, 1970, pages 548-552. One of the problems involved is the difficulty in handling and solubilizing these polymers, particularly in liquid hydrocarbons. Various means are used to solve this problem such as grinding such polymers into small particles as described in U.S. Pat. No. 3,215,154. However, known methods such as mentioned are costly and not very effective because they degrade and destroy the friction reducing properties of the polymer.

The present invention overcomes the above described difficulties of the prior art, and provides a successful solution thereto, as will be apparent from the following description thereof.

SUMMARY OF THE INVENTION

It is a purpose of this invention to particulate polymers without degradation thereof, particularly those useful as friction reducing agents in flowing hydrocarbons.

This purpose is achieved by dissolving a polymer in a solvent, adding a surfactant and water to form polymer particles in the resulting liquid. The solvent is flashed off and the resultant polymer particles are removed. The particles alone or both the particles and water may be injected into a hydrocarbon.

Preferably, there is provided a polymer dissolved in solvent to which is added a surfactant and water to form polymer particles in the resulting liquid, the solvent is flashed off, the particles and liquid are separated and the particles are injected into a flowing hydrocarbon. Alternatively, both the particles and water may be injected into the flowing hydrocarbon.

More preferably, to a polymer dissolved in a solvent there is first added a non-ionic surfactant having hydrophobichydrophilic constituents in the molecule and secondly added water to form polymer particles in the liquid thereby formed, the solvent is flashed off, and the particles and liquid are separated. Most preferably, the surfactant is a phenoxypolyethoxy alcohol. Alternatively, the particles and liquid are not separated, prior to admixing the particles with a hydrocarbon, e.g. a flowing hydrocarbon where the particles dissolve and the polymer serves as a friction reducing agent.

Within the framework of the above described processes the present invention not only solves the above mentioned problems of the prior art, but also achieves further significant advantages as will be apparent from the description of preferred embodiments following.

DESCRIPTION OF THE PREFERRED EMBODIMENTS

Now, in accordance with this invention, it has been found that friction reducing, substantially water insoluble, polymeric materials such as polyolefins, polyisoolefins, and the like which are difficult to handle and disperse in a carrier can be fragmented or particulated without degradation so as to render them easy to handle and make them readily dissolvable in hydrocarbon liquids or hydrocarbon slurries for pipeline transportation by providing polymeric material dissolved in a volatile solvent and thereafter admixing the polymeric material with a non-ionic surfactant having hydrophobic-hydrophilic constituents in the molecule and having the formula:

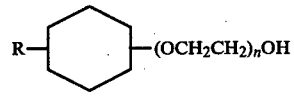

wherein R is an alkyl radical having from 4 to 20 carbon atoms, preferably 6 to 10 carbon atoms, and n is an integer of from 2 to 8. An aqueous liquid is then added and may be followed by mild agitation. The particles are recovered by flashing off the solvent, and removing from the liquid by known methods. Preferably, the solvent is recovered for further use. Alternatively, the particles may be separated only from the solvent and allowed to remain with the other liquid.

The non-ionic surfactants used in spontaneously fragmenting and dispersing dissolved polymeric materials into small particles are phenoxypolyethoxy alcohols containing from 2 to 8, and preferably 3 to 7, ethylene oxide units in the molecule as represented by the above formula. More than 8 ethylene oxide units requires vigorous mixing of the polymer, surfactant, solvent and water as in the process of U.S. Pat. No. 3,503,917 using Triton X-100 which degrades the polymer, rendering it substantially less desirable for friction reduction use in crude oil. Surfactants of this class are available under the trade names of Triton X-45, Triton N-57 (Rohm-Haas) and Tergitol NP-14 (Union Carbide) of which preferred is Triton X-45 (octylphenoxypentaethoxy alcohol). The amount of this class of surfactant which is used can vary from about 0.05% to about 10% by weight based on the weight of the polymer solvent.

Solvents are those which are typically used in producing polymers such as those above noted and are water immiscible, e.g., low boiling polar and/or nonpolar solvents such as a low boiling hydrocarbon, e.g., propane, hexane, cyclohexane, benzene, xylene, polar solvents such as ketones, e.g., ethyl methyl ketone, others, etc.

Friction reducing polymers fragmented into small particles by the process of this invention include, but are not limited to, polyisobutylene, polyethylene, copolymers of ethylene and propylene, randomly or block distributed, polyisoprene (cis or trans), and copolymers of styrene and ethylene. The molecular weight of these polymers can range from 1000 to many million, preferably between 5,000,000 and 20,000,000.

EXAMPLES (A) Polyisobutylene (MW=5−12×10) was dissolved in cyclohexane containing about 0.6% by volume Triton X-45 based on the cyclohexane and thereafter admixed with water. The polymeric fragments of 1 to 50 microns were recovered by vaporizing off the solvent and separating the polymer particles from the water solution. Optionally, the polymer particles are injected into a flowing stream of crude oil, to dissolve in situ and function as friction reducing agents. Optionally also, the particles are not separated from the water remaining after the solvent is removed, but both particles and water are injected into a crude oil.

(B) Polyisobutylene (MW=5−12×10) is dissolved in cyclohexane containing about 1% Triton N-57 by volume based on the cyclohexane and thereafter admixed with water. The polymeric fragments of 1 to 500 microns are recovered by flashing off the solvent and separating the polymer particles from the water solution. Optionally, the polymer particles are injected into a flowing stream of crude oil, to dissolve in situ and function as friction reducing agents. Optionally also, the particles are not separated from the water remaining after the solvent is removed, but both particles and water are injected into a crude oil.

(C) Polyisoprene was dissolved in cyclohexane containing about 0.6% by volume Triton X-45 based on the cyclohexane and thereafter admixed with water. The polymeric fragments of 1 to 50 microns were recovered by vaporizing off the solvent and separating the polymer particles from the water solution by filtration. Optionally, the polymer particles are injected into a flowing stream of crude oil, to dissolve in situ and function as friction reducing agents. Optionally also, the particles are not separated from the water remaining after the solvent is removed, but both particles and water are injected into a crude oil.

(D) 2200 ppm Polyisoprene was dissolved in acid treated kerosene and 1% by volume Triton X-45 was added to part of the resulting solution. To the remaining part of the resulting solution was added 1% by volume Triton X-100. The Triton X-45 readily dissolved, but the Triton X-100 formed separate liquid droplets in the solution. To each of the solutions was then added 5 parts of water. The solution containing Triton X-45 instantly formed an emulsion as indicated by its milky appearance. The solution containing Triton X-100 did not emulsify to the same extent, had much larger particle sized droplets and was not as persistent as that observed with the X-45 treated solution.

I claim as my invention:

1. A process for reducing the flowing friction of a liquid hydrocarbon in a pipeline with a polymer of at least 1,000 molecular weight and soluble in the hydrocarbon, comprising preparing a particulated, substantially undegraded polymer for introduction into the hydrocarbon by mixing the polymer with a water-immiscible, low-boiling solvent, water, and from about 0.05% to about 10% by weight, based on the weight of the solvent, of a surfactant having the formula

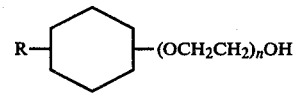

wherein R is an alkyl radical having from 4 to 20 carbon atoms and n is an integer of from 2 to 8, whereby the polymer is dissolved in the solvent, and forming polymer particles by flashing off the solvent, separating the particles from the water, and injecting the particles into the hydrocarbon.

2. The process of claim 1 wherein the polymer is dissolved in the solvent which contains the surfactant, and water is added to the dissolved polymer, solvent, and surfactant.

3. The process of claim 2 wherein the dissolved polymer solvent, surfactant and water are mildly agitated.

4. The process of claim 1 wherein the surfactant and water are added to the dissolved polymer.

5. The process of claim 4 wherein the dissolved polymer, solvent, surfactant and water are mildly agitated.

6. The method of claim 1 wherein n is an integer of from 3 to 7.

7. The process of claim 1 wherein the surfactant is a phenoxypolyethoxy alcohol.

8. The process of claim 1 wherein the surfactant is an octylphenoxypentaethoxy alcohol.

9. The process of claim 7 wherein the polymer is selected from the group consisting of polyisobutylene, polyethylene, enthylenepropylene copolymer, and polyisoprene.

10. A process for reducing the flowing friction of a liquid hydrocarbon in a pipeline with a polymer of at least 1,000 molecular weight and soluble in the hydrocarbon, comprising preparing a particulated, substantially undegraded polymer for introduction into the hydrocarbon by mixing the polymer with a water-immiscible, low-boiling solvent, water, and from about 0.05% to about 10% by weight, based on the weight of the solvent, of a surfactant having the formula

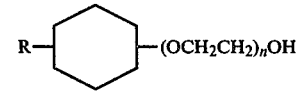

wherein R is an alkyl radical having from 4 to 20 carbon atoms and n is an integer of from 2 to 8, whereby the polymer is dissolved in the solvent, and forming polymer particles by flashing off the solvent, and contacting the hydrocarbon with the particles.

11. A process for reducing the flowing friction of a liquid hydrocarbon in a pipeline with a polymer of at least 1,000 molecular weight and soluble in the hydrocarbon, comprising preparing a particulated, substantially undegraded polymer for introduction into the hydrocarbon by mixing the polymer with a water-immiscible, low-boiling solvent, water, and from about 0.05% to about 10% by weight, based on the weight of the solvent, of a surfactant having the formula

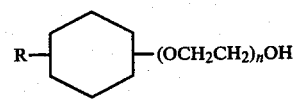

wherein R is an alkyl radical having from 4 to 20 carbon atoms and n is an integer of from 2 to 8, whereby the polymer is dissolved in the solvent, and forming polymer particles by flashing off the solvent, and injecting the particles and water into the hydrocarbon.